US 10,713,193 B2

(12) United States Patent
Shen (10) Patent No.: US 10,713,193 B2
(45) Date of Patent: Jul. 14, 2020

(54) METHOD FOR REMOTELY TRIGGERED RESET OF A BASEBOARD MANAGEMENT CONTROLLER OF A COMPUTER SYSTEM, AND COMPUTER SYSTEM USING THE SAME (71) Applicant: MITAC COMPUTING TECHNOLOGY CORPORATION, Taoyuan (TW)

(72) Inventor: Ming-Shou Shen, Taoyuan (TW)

(73) Assignee: Mitac Computing Technology Corporation, Taoyuan (TW)

( * ) Notice: Subject to any disclaimer, the term of this patent is extended or adjusted under 35 U.S.C. 154(b) by 39 days.

(21) Appl. No.: 16/188,458

(22) Filed: Nov. 13, 2018

(65) Prior Publication Data
US 2019/0171593 A1 Jun. 6, 2019

(30) Foreign Application Priority Data
Dec. 1, 2017 (TW) .............................. 106142080 A (51) Int. Cl.
*G06F 3/00* (2006.01)
*G06F 13/20* (2006.01)
*G06F 11/14* (2006.01)
*G06F 13/12* (2006.01)

(52) U.S. Cl.
CPC .......... *G06F 13/20* (2013.01); *G06F 11/1441* (2013.01); *G06F 13/122* (2013.01); *G06F 2213/3808* (2013.01)

(58) Field of Classification Search
CPC ...... G06F 13/00; G06F 13/20; G06F 11/1441; G06F 13/122

USPC ..................... 710/5, 305–306, 100
See application file for complete search history.

(56) References Cited

U.S. PATENT DOCUMENTS

2014/0195704 A1* 7/2014 Bhatia ................. G06F 13/42
710/105
2016/0239370 A1* 8/2016 Chen .................. G06F 11/0793

FOREIGN PATENT DOCUMENTS

CN 105739656 A 7/2016
TW 201704929 A 2/2017

OTHER PUBLICATIONS

Search Report appended to an Office Action issued to Taiwanese counterpart application No. 106142080 by the TIPO dated Nov. 16, 2018, with an English translation thereof (2 pages).

* cited by examiner

*Primary Examiner* — Tim T Vo
*Assistant Examiner* — Kim T Huynh
(74) *Attorney, Agent, or Firm* — Michael Best & Friedrich LLP (57) ABSTRACT

A method for remotely triggered reset of a baseboard management controller (BMC) of a computer system is disclosed. The computer system includes a first computer node, a second computer node and a control unit. The method includes: (A) receiving, by a first BMC of the first computer node, from a computer device and via a network, a reset command which indicates that reset of a second BMC of the second computer node should be triggered; (B) transmitting, by the first BMC and to the control unit, a control signal that corresponds to the reset command; and (C) transmitting, by the control unit and to the second BMC, a reset signal that corresponds to the control signal, so as to trigger reset of the second BMC.

15 Claims, 6 Drawing Sheets

METHOD FOR REMOTELY TRIGGERED RESET OF A BASEBOARD MANAGEMENT CONTROLLER OF A COMPUTER SYSTEM, AND COMPUTER SYSTEM USING THE SAME

CROSS-REFERENCE TO RELATED APPLICATION

This application claims priority of Taiwanese Patent Application No. 106142080, filed on Dec. 1, 2017.

FIELD

The disclosure relates to management of a computer system, and more particularly to a method for remotely triggered reset of a baseboard management controller of a computer system and to a computer system using the same.

BACKGROUND

A conventional computer server system generally includes multiple computer nodes. Each computer node includes a baseboard management controller that can monitor operating states of the computer node. The baseboard management controller can be linked to an external computer device via a network, so a user can operate the external computer device to obtain the operating states of the computer node from the baseboard management controller via the network, and to trigger reset of the baseboard management controller via the network.

For each computer node, when the baseboard management controller is in an abnormal condition and cannot respond to requests from the external computer device, the user is unable to remotely trigger the reset of the baseboard management controller via the network by operating the external computer device to return the baseboard management controller to a normal condition. Unless there are other ways to return the baseboard management controller to the normal condition, the user has to visit the location of the conventional computer server system, and operate the conventional computer server system in person to trigger the reset of the baseboard management controller or remove the cause for the abnormal condition, which is inconvenient for the user.

Chinese Patent Application Publication No. 105739656A discloses another conventional computer server system that includes multiple computer nodes and a rack management controller, and that can automatically trigger reset of a baseboard management controller of each computer node. The rack management controller is electrically coupled to each baseboard management controller, periodically detects whether the baseboard management controller is in a normal condition, and triggers the reset of the baseboard management controller upon detecting that the baseboard management controller is not in the normal condition. Because of the periodic detection, the rack management controller is frequently in a high loading condition, and will become broken easily.

SUMMARY

Therefore, an object of the disclosure is to provide a method for remotely triggered reset of a baseboard management controller of a computer system that can alleviate at least one drawback of the prior art, and a computer system using the same.

According to an aspect of the disclosure, there is provided the method for remotely triggered reset of a baseboard management controller of a computer system. The computer system includes a first computer node, a second computer node and a control unit. The first computer node includes a first baseboard management controller that is electrically coupled to the control unit, and that is linked to a computer device via a network. The second computer node includes a second baseboard management controller that is electrically coupled to the control unit. The method includes: (A) receiving, by the first baseboard management controller, from the computer device and via the network, a reset command which indicates that reset of the second baseboard management controller should be triggered; (B) transmitting, by the first baseboard management controller and to the control unit, a control signal that corresponds to the reset command; and (C) transmitting, by the control unit and to the second baseboard management controller, a reset signal that corresponds to the control signal, so as to trigger the reset of the second baseboard management controller.

According to another aspect of the disclosure, the computer system includes a control unit, a first computer node and a second computer node. The first computer node includes a first baseboard management controller that is electrically coupled to the control unit, and that is used to be linked to a computer device via a network. The second computer node includes a second baseboard management controller that is electrically coupled to the control unit. The first baseboard management controller receives, from the computer device and via the network, a reset command which indicates that reset of the second baseboard management controller should be triggered. The first baseboard management controller transmits, to the control unit, a control signal that corresponds to the reset command. The control unit transmits, to the second baseboard management controller, a reset signal that corresponds to the control signal, so as to trigger the reset of the second baseboard management controller.

According to yet another aspect of the disclosure, there is provided the method for remotely triggered reset of a baseboard management controller of a computer system. The computer system includes a first computer node and a second computer node. The first computer node includes a first baseboard management controller that is linked to a computer device via a network. The second computer node includes a second baseboard management controller that is electrically coupled to the first baseboard management controller. The method includes: (A) receiving, by the first baseboard management controller, from the computer device and via the network, a reset command which indicates that reset of the second baseboard management controller should be triggered; and (B) transmitting, by the first baseboard management controller and to the second baseboard management controller, a reset signal that corresponds to the reset command, so as to trigger the reset of the second baseboard management controller.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
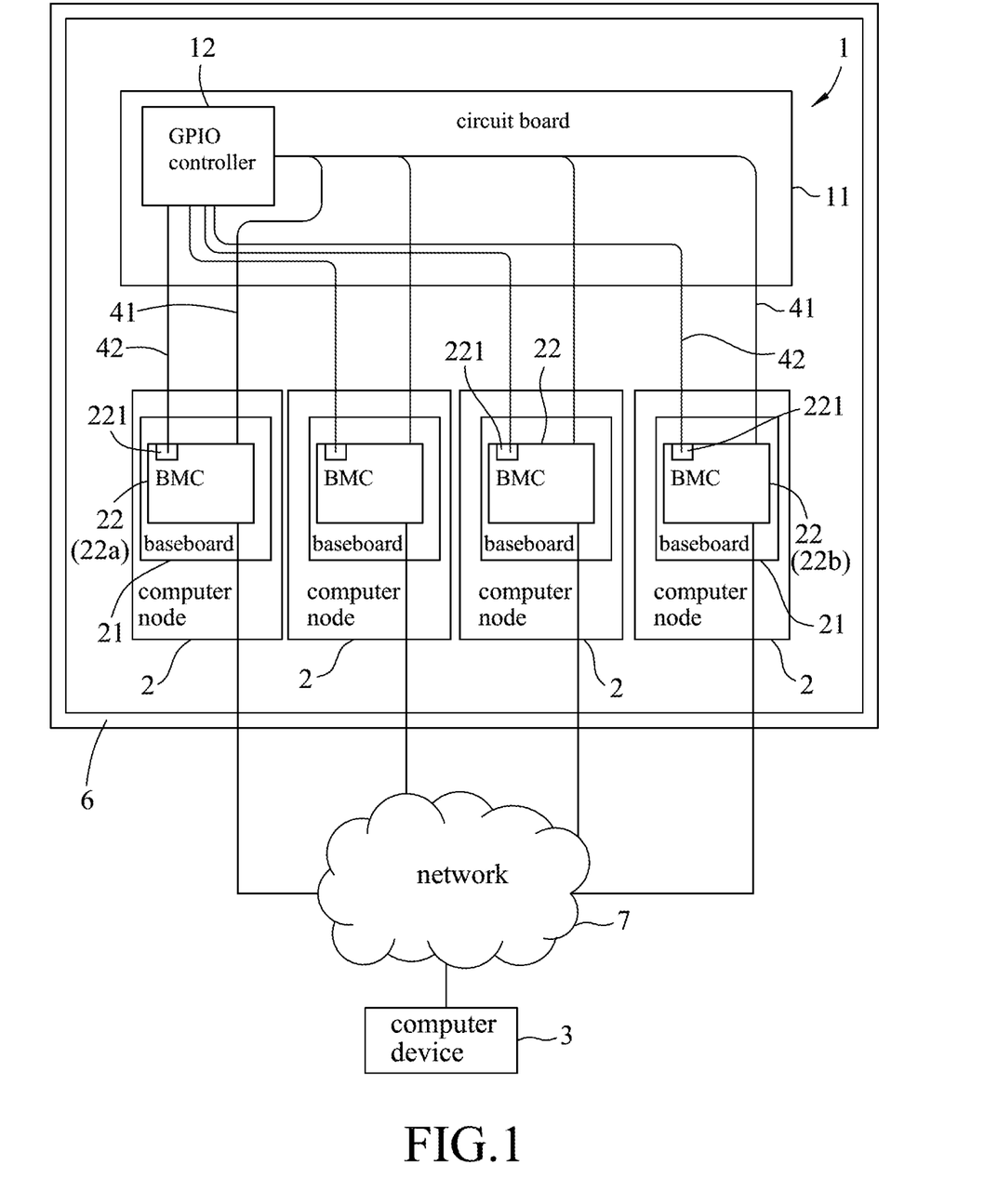
FIG. 1 is a block diagram illustrating a first embodiment of a computer system according to the disclosure.

Referring to FIG. 1, a first embodiment of a computer system according to the disclosure is used to be installed in a server rack 6, and includes a control unit 1 and a plurality of computer nodes 2. For illustration purposes, there are four computer nodes 2 in this embodiment.

The control unit 1 is used to be installed on a backplane (not shown) of the server rack 6, and includes a circuit board 11 and a general purpose input/output (GPIO) controller 12 that is disposed on the circuit board 11. Each computer node 2 includes a baseboard 21 and a baseboard management controller (BMC) 22 that is disposed on the baseboard 21. Each baseboard management controller 22 is electrically coupled to the general purpose input/output controller 12 via the corresponding baseboard 21 and the circuit board 11, so as to form a first channel 41 therebetween for transmitting control signals.

In particular, each baseboard management controller 22 has a reset pin 221. The reset pin 221 of each baseboard management controller 22 is electrically coupled to a respective pin (not shown) of the general purpose input/output controller 12 via the corresponding baseboard 21 and the circuit board 11, so as to form a second channel 42 therebetween for transmitting reset signals.

In addition, each baseboard management controller 22 is used to be linked to a remote or external computer device 3 via a network 7.

In this embodiment, the control unit 1 is a general purpose input/output expander, and is controlled by each baseboard management controller 22.

Figure 2:
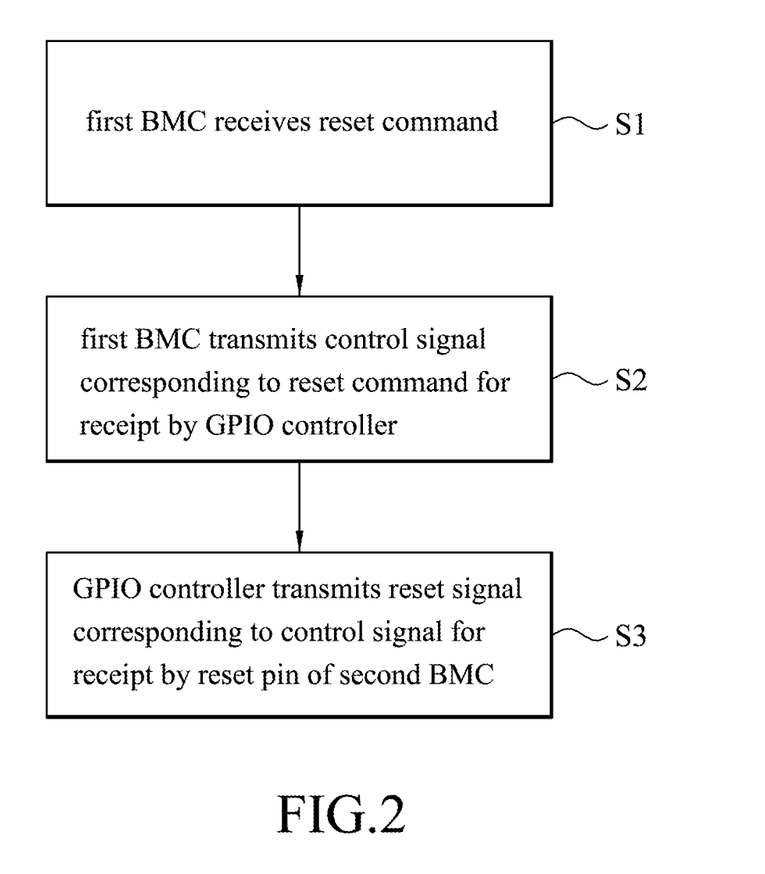
FIG. 2 is a flow chart illustrating a method for remotely triggered reset of a baseboard management controller of the first embodiment.

Referring to FIGS. 1 and 2, a method performed by the computer system of this embodiment for remotely triggered reset of a baseboard management controller of the computer system includes the following steps (S1-S3) as shown in FIG. 2.

In step S1, one of the baseboard management controllers 22 (hereinafter referred to as the first baseboard management controller (22a) for simplicity) receives, from the computer device 3 and via the network 7, a reset command which indicates that reset of another one of the baseboard management controllers 22 (hereinafter referred to as the second baseboard management controller (22b) for simplicity) should be triggered. The reset command is generated by the computer device 3 based on an operation performed by a user on the computer device 3.

In step S2, the first baseboard management controller (22a) transmits, to the general purpose input/output controller 12 and via the corresponding first channel 41, a control signal that corresponds to the reset command.

In step S3, the general purpose input/output controller 12 transmits, to the reset pin 221 of the second baseboard management controller (22b) and via the corresponding second channel 42, a reset signal that corresponds to the control signal, so as to trigger the reset of the second baseboard management controller (22b).

Figure 3:
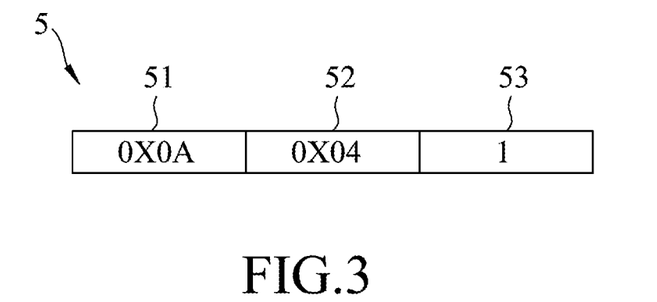
FIG. 3 is a schematic diagram illustrating a reset command of the first embodiment.

Referring to FIGS. 1 and 3, in this embodiment, transmission of signals and data via the circuit board 11 and the baseboards 21 for the reset operation is implemented using an inter-integrated circuit (I2C) bus. The general purpose input/output controller 12 is assigned a device address (e.g., 0X0A). The baseboard management controllers 22 are assigned respective serial numbers (four in total in this embodiment, e.g., 0X01, 0X02, 0X03 and 0X04). The reset command 5 includes a device address field 51, a serial number field 52 and a reset field 53. The device address field 51 contains the device address of the device that is to transmit the reset signal. The serial number field 52 contains the serial number of one of the baseboard management controllers 22 that is to receive the reset signal. The reset field 53 contains one of a logic "0" and a logic "1", one of which (e.g., the logic "0") denotes that reset should not be triggered, and the other one of which (e.g., the logic "1") denotes that reset should be triggered. In step S1, the device address field 51 contains the device address "0X0A" of the general purpose input/output controller 12; the serial number field 52 contains the serial number "0X04" of the second baseboard management controller (22b); and the reset field 53 contains the logic "1".

In response to the receipt of the reset command 5 from the computer device 3, the first baseboard management controller (22a) decodes the reset command 5, generates the control signal that indicates the serial number contained in the serial number field 52 of the reset command 5 and the logic value contained in the reset field 53 of the reset command 5, and transmits the control signal to the device that corresponds to the device address contained in the device address field 51 of the reset command 5 via the channel that is formed between the first baseboard management controller (22a) and that device. In step S2, the control signal indicates the serial number "0X04" of the second baseboard management controller (22b) and the logic "1", and is transmitted to the general purpose input/output controller 12 that corresponds to the device address "0X0A" contained in the device address field 51 via one of the first channels 41 that corresponds to the first baseboard management controller (22a).

Based on the serial number and the logic value indicated by the control signal, the general purpose input/output controller 12 transmits, to the reset pin 221 of one of the baseboard management controllers 22 that corresponds to the serial number and via one of the second channels 42 that corresponds to said one of the baseboard management controllers 22, the reset signal that corresponds to the logic value to trigger or not to trigger the reset of said one of the baseboard management controllers 22. The reset signal is at one of a logic low level and a logic high level (e.g., the logic low level) when the control signal indicates the logic "0", and is at the other one of the logic low level and the logic high level (e.g., the logic high level) when the control signal indicates the logic "1". As an example, in step S3, the reset signal is at the logic high level and is transmitted to the reset pin 221 of the second baseboard management controller (22b), so as to trigger the reset of the second baseboard management controller (22b); and the reset of the second baseboard management controller (22b) is not triggered when the reset signal transmitted to the reset pin 221 of the second baseboard management controller (22b) is at the logic low level.

In application, when one of the baseboard management controllers 22 (e.g., the first baseboard management controller (22a)) is in a normal condition while another one of the baseboard management controllers 22 (e.g., the second baseboard management controller (22b)) is in an abnormal condition, the user can operate the computer device 3 to transmit the reset command 5, indicating that the reset of the abnormally-operating baseboard management controller 22 should be triggered, to the normally-operating baseboard management controller 22, so that the computer system of this embodiment performs the method to trigger the reset of the abnormally-operating baseboard management controller 22, thereby returning the abnormally-operating baseboard management controller 22 to the normal condition.

Moreover, the general purpose input/output controller 12 of this embodiment transmits the reset signal, representing that reset should be triggered, to the reset pin 221 of the second baseboard management controller (22b) in response to the receipt of the control signal indicating the serial number of the second baseboard management controller (22b) and that reset should be triggered, rather than periodically detecting whether each baseboard management controller 22 is in the normal condition as does the rack management controller of the conventional computer server system. Therefore, the general purpose input/output controller 12 of this embodiment is often in a low loading condition, and will not become broken easily.

In view of the above, in this embodiment, by virtue of the computer system that performs the method to trigger the reset of a baseboard management controller 22 thereof, the baseboard management controller 22 that is in the abnormal condition can be returned to the normal condition by remotely transmitting the reset command to another baseboard management controller 22 that is in the normal condition, so the general purpose input/output controller 12 is generally not highly loaded, and will not become broken easily.

Figure 4:
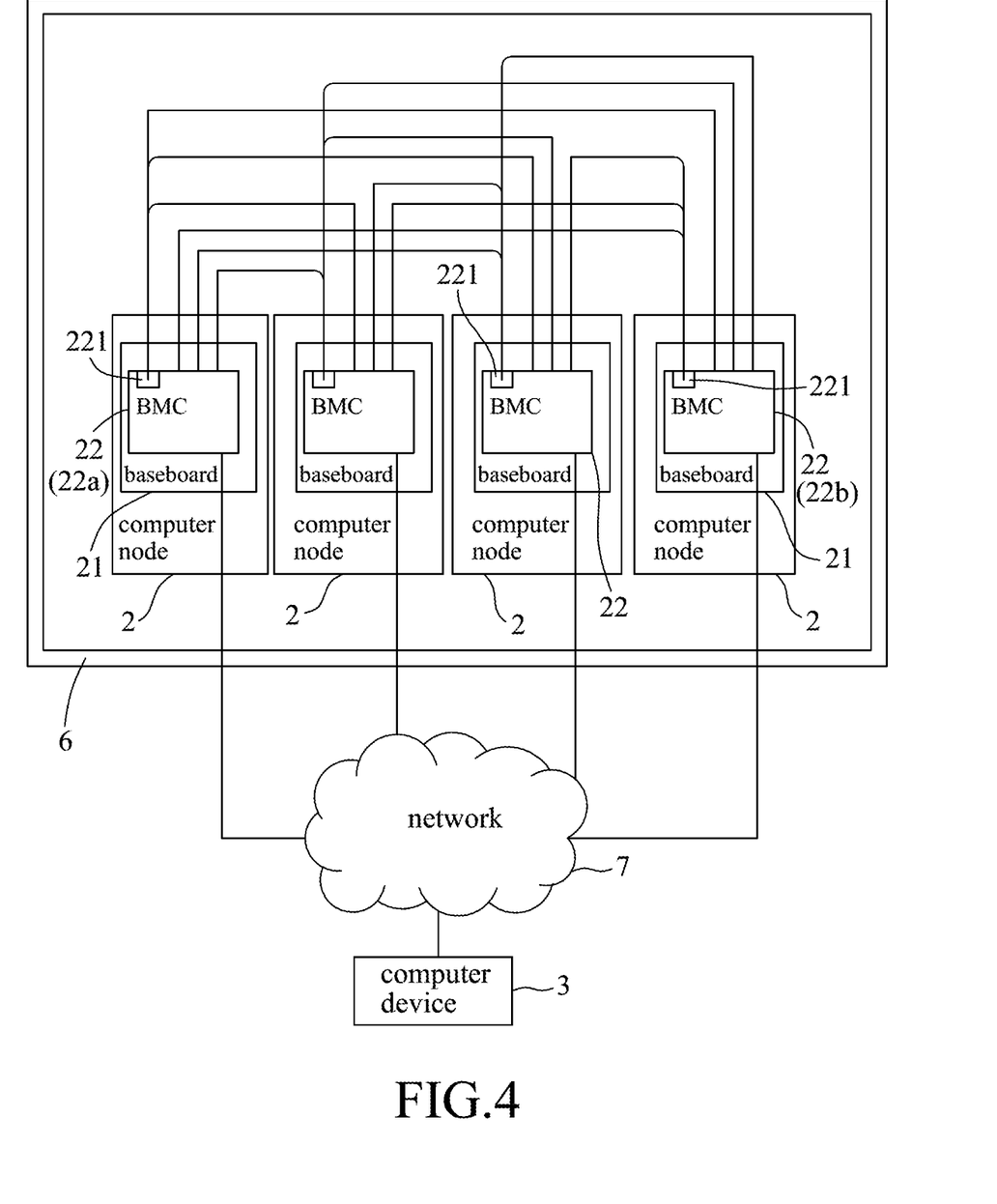
FIG. 4 is a block diagram illustrating a second embodiment of the computer system according to the disclosure.

Referring to FIG. 4, a second embodiment of the computer system according to the disclosure is similar to the first embodiment, and differs from the first embodiment in what are described below.

In the second embodiment, the control unit 1 (see FIG. 1) is omitted, and each baseboard management controller 22 has three pins (not shown) that are respectively and electrically coupled to the reset pins 221 of the remaining baseboard management controllers 22.

Figure 5:
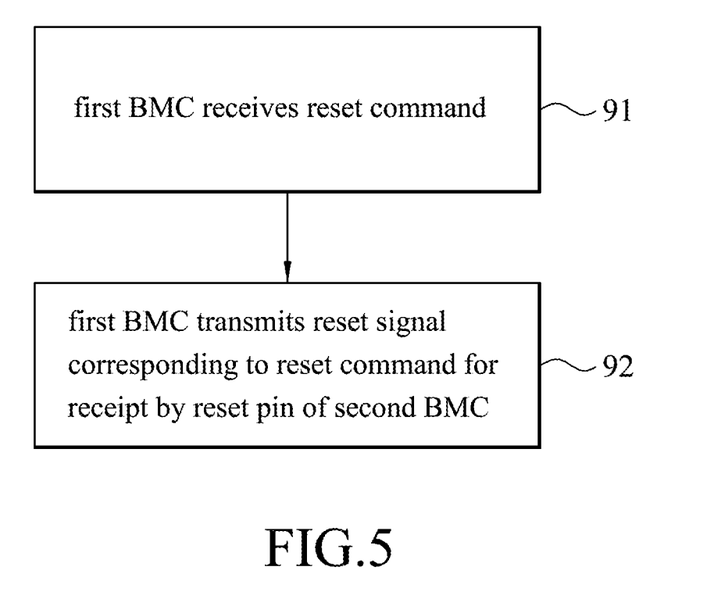
FIG. 5 is a flow chart illustrating a method for remotely triggered reset of a baseboard management controller of the second embodiment.

Referring to FIGS. 4 and 5, the method performed by the computer system of this embodiment for remotely triggered reset of a baseboard management controller of the computer system includes the following steps (91, 92) as shown in FIG. 5.

In step 91, the first baseboard management controller (22a) receives, from the computer device 3 and via the network 7, a reset command which indicates that reset of the second baseboard management controller (22b) should be triggered.

In step 92, the first baseboard management controller (22a) transmits, to the reset pin 221 of the second baseboard management controller (22b) via the corresponding pin of the first baseboard management controller (22a), a reset signal that corresponds to the reset command, so as to trigger the reset of the second baseboard management controller (22b).

Figure 6:
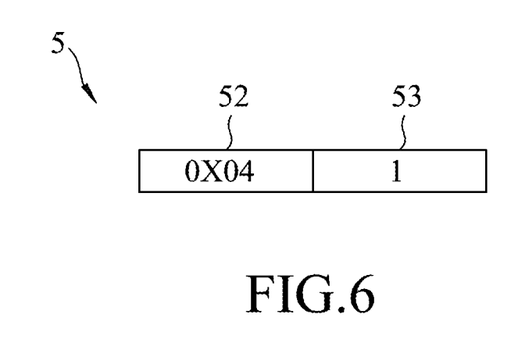
FIG. 6 is a schematic diagram illustrating a reset command of the second embodiment.

Referring to FIGS. 4 and 6, in this embodiment, the reset command 5 includes the serial number field 52 and the reset field 53, but does not include the device address field 51 (see FIG. 3). In step 91, the serial number field 52 contains the serial number "0X04" of the second baseboard management controller (22b); and the reset field 53 contains the logic "1".

In response to the receipt of the reset command 5 from the computer device 3, the first baseboard management controller (22a) decodes the reset command 5, generates the reset signal that corresponds to the logic value contained in the reset field 53 of the reset command 5, and transmits the reset signal to the reset pin 221 of one of the baseboard management controllers 22 that corresponds to the serial number contained in the serial number field 52 of the reset command 5 so as to trigger or not to trigger the reset of said one of the baseboard management controllers 22. The reset signal is at one of a logic low level and a logic high level (e.g., the logic low level) when the logic value contained in the reset field 53 of the reset command 5 denotes that reset should not be triggered, and has one of a logic low pulse and a logic high pulse (e.g., the logic high pulse) when the logic value contained in the reset field 53 of the reset command 5 denotes that reset should be triggered. In step 92, the reset signal has the logic high pulse and is transmitted to the reset pin 221 of the second baseboard management controller (22b), so as to trigger the reset of the second baseboard management controller (22b).

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that the disclosure is not limited to the disclosed embodiments but is intended to cover various arrangements included within the spirit and scope of the broadest interpretation so as to encompass all such modifications and equivalent arrangements.

What is claimed is:

1. A method for remotely triggered reset of a baseboard management controller of a computer system, the computer system including a first computer node, a second computer node and a control unit, the first computer node including a first baseboard management controller that is electrically coupled to the control unit and that is linked to a computer device via a network, the second computer node including a second baseboard management controller that is electrically coupled to the control unit, said method comprising:

(A) receiving, by the first baseboard management controller, from the computer device and via the network, a reset command which indicates that reset of the second baseboard management controller should be triggered;

(B) transmitting, by the first baseboard management controller and to the control unit, a control signal that corresponds to the reset command; and (C) transmitting, by the control unit and to the second baseboard management controller, a reset signal that corresponds to the control signal, so as to trigger the reset of the second baseboard management controller.

2. The method of claim 1, the control unit including a general purpose input/output controller, wherein:
in step (B), the control signal is transmitted to the general purpose input/output controller; and
in step (C), the reset signal is transmitted by the general purpose input/output controller.

3. The method of claim 2, the second baseboard management controller having a reset pin, and being electrically coupled to the general purpose input/output controller via the reset pin, wherein:
in step (C), the reset signal is transmitted to the reset pin.

4. The method of claim 3, wherein:
in step (C), the reset signal is at a logic high level.

5. The method of claim 2, the general purpose input/output controller being assigned a device address, the second baseboard management controller being assigned a serial number, wherein:
in step (A), the reset command includes a device address field which contains the device address of the general purpose input/output controller, a serial number field which contains the serial number of the second baseboard management controller, and a reset field which contains an indication that reset should be triggered.

6. The method of claim 5, wherein:
in step (B), the control signal indicates the serial number of the second baseboard management controller and that reset should be triggered.

7. The method of claim 6, wherein:
in step (C), the reset signal represents that reset should be triggered.

8. A computer system comprising:
a control unit;
a first computer node including a first baseboard management controller that is electrically coupled to said control unit, and that is used to be linked to a computer device via a network; and
a second computer node including a second baseboard management controller that is electrically coupled to said control unit;
wherein said first baseboard management controller receives, from the computer device and via the network, a reset command which indicates that reset of said second baseboard management controller should be triggered;
wherein said first baseboard management controller transmits, to said control unit, a control signal that corresponds to the reset command; and
wherein said control unit transmits, to said second baseboard management controller, a reset signal that corresponds to the control signal, so as to trigger the reset of said second baseboard management controller.

9. The computer system of claim 8, wherein:
said control unit includes a general purpose input/output controller;
the control signal is transmitted to said general purpose input/output controller; and
the reset signal is transmitted by said general purpose input/output controller.

10. The computer system of claim 9, wherein:
said second baseboard management controller has a reset pin, and is electrically coupled to said general purpose input/output controller via said reset pin; and
the reset signal is transmitted to said reset pin.

11. The computer system of claim 10, wherein:
the reset signal is at a logic high level.

12. The computer system of claim 11, wherein:
said control unit is used to be installed in a server rack.

13. The computer system of claim 9, wherein:
said general purpose input/output controller is assigned a device address;
said second baseboard management controller is assigned a serial number; and
the reset command includes a device address field which contains the device address of said general purpose input/output controller, a serial number field which contains the serial number of said second baseboard management controller, and a reset field which contains an indication that reset should be triggered.

14. The computer system of claim 13, wherein:
the control signal indicates the serial number of said second baseboard management controller and that reset should be triggered.

15. The computer system of claim 14, wherein:
the reset signal represents that reset should be triggered.

* * * * *